(12) United States Patent
Barber

(10) Patent No.: US 8,120,548 B1
(45) Date of Patent: Feb. 21, 2012

(54) SYSTEM, MODULE, AND METHOD FOR ILLUMINATING A TARGET ON AN AIRCRAFT WINDSHIELD

(75) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 332 days.

(21) Appl. No.: 12/569,839

(22) Filed: Sep. 29, 2009

(51) Int. Cl.
G09G 5/00 (2006.01)
(52) U.S. Cl. .......................................................... 345/7
(58) Field of Classification Search .................. None
See application file for complete search history.

(56) References Cited

U.S. PATENT DOCUMENTS

| 7,625,287 B2 * | 12/2009 | Champagne et al. | 463/38 |
| 2006/0066459 A1 * | 3/2006 | Burch et al. | 340/980 |
| 2008/0154550 A1 * | 6/2008 | Eakins et al. | 703/1 |

OTHER PUBLICATIONS

U.S. Appl. No. 11/820,950, filed Jun. 21, 2007, Krenz et al.

* cited by examiner

Primary Examiner — Muhammad N Edun
(74) Attorney, Agent, or Firm — Donna P. Suchy; Daniel M. Barbieri

(57) ABSTRACT

A present novel and non-trivial system, module, and method for illuminating a target on an aircraft windshield corresponding to a three-dimensional location outside of an aircraft. Navigation data and three-dimensional location data are provided to a control processor; the navigation data may comprise aircraft position, heading, and pitch, roll, and yaw attitudes, and the three-dimensional location data may comprise a runway reference point. After an external target angle and track angle are determined, control data may be generated as a function of pitch, roll and/or yaw attitudes, glide path angle, track angle, and cockpit references originating from a design eye position. Control data may comprise data representative of vertical and/or lateral measurements which position a beam on a windshield target. Then, the control data may be provided to an illumination source for positioning a beam on the windshield target in response to the control data.

24 Claims, 13 Drawing Sheets

Formulas 5-1

$Z(1) = VSL / \cos(SA(1))$
$Y(1) = VSL * \tan(SA(1))$

Formula 5-2

$X'(1) = HVL * \tan(PA+GPA)$

Formula 5-3

$Z'(1) = X'(1) * \sin(90+PA+GPA) / \sin(90-SA(1)-PA-GPA)$

Formula 5-4

$TD(V) = SQRT((HSL-Y(1))^2 + (Z(1)+Z'(1))^2 - 2*(HSL-Y(1))*(Z(1)+Z'(1))*\cos(90+SA(1)))$

Formula 5-5

$TA(V) = \arcsin((Z(1)+Z'(1)) * \sin(90+SA(1)) / TD(V))$

FIG. 5

Formulas 7-1

$Z(2) = LSL / \cos(SA(2))$
$Y(2) = LSL * \tan(SA(2))$

Formula 7-2

$X'(2) = HVL * \tan(TRA)$

Formula 7-3

$Z'(2) = X'(2) * \sin(90+TRA) / \sin(90-SA(2)-TRA)$

Formula 7-4

$TD(L) = SQRT((HSL-Y(2))^2 + (Z(2)+Z'(2))^2 - 2*(HSL-Y(2))*(Z(2)+Z'(2))*\cos(90+SA(2)))$

Formula 7-5

$TA(L) = \arcsin((Z(2)+Z'(2)) * \sin(90+SA(2)) / TD(L))$

FIG. 7

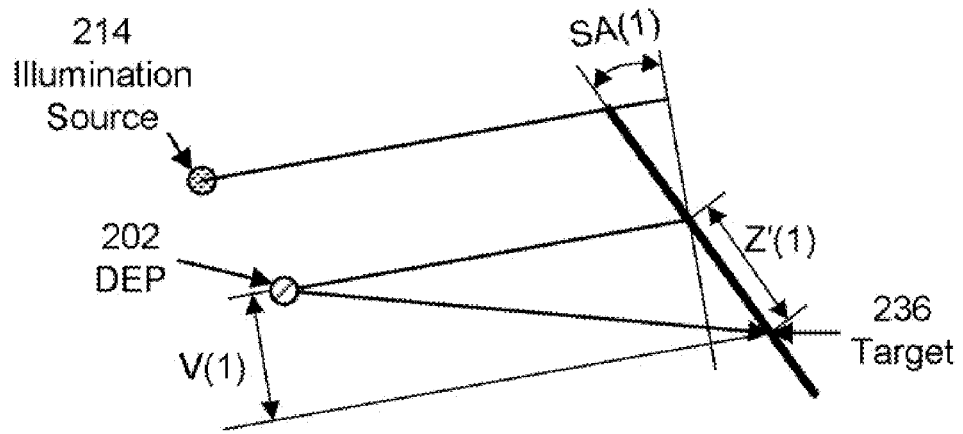
Formula 8-1
$V(1) = Z'(1) * \cos(SA(1))$
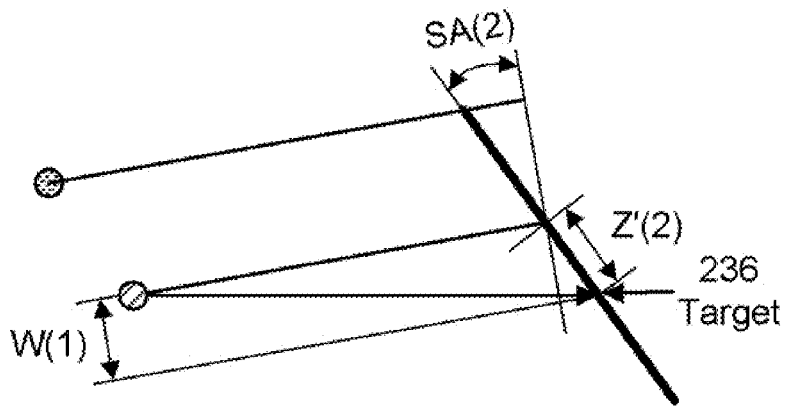
Formula 8-2
$W(1) = Z'(2) * \cos(SA(2))$
FIG. 8A

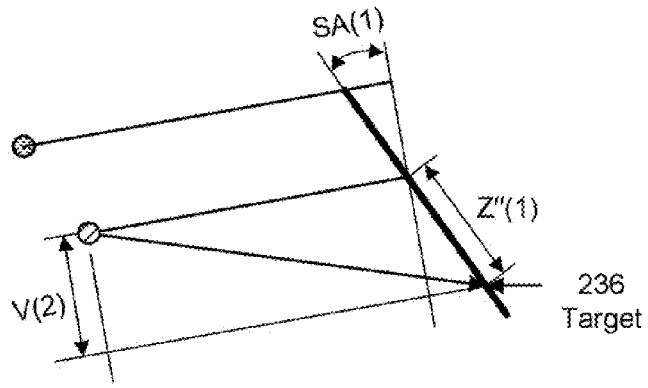
Formula 8-7
$$Z''(1) = V(2) / \cos(SA(1))$$
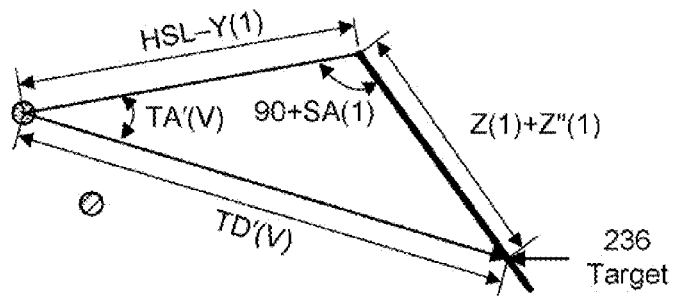
Formula 8-8
$$TD'(V) = SQRT((HSL-Y(1))^2+(Z(1)+Z''(1))^2-2*(HSL-Y(1))*(Z(1)+Z''(1))*\cos(90+SA(1)))$$
Formula 8-9
$$TA'(V) = \arcsin(Z(1)+Z''(1) * \sin(90+SA(1)) / TD'(V))$$
FIG. 8D

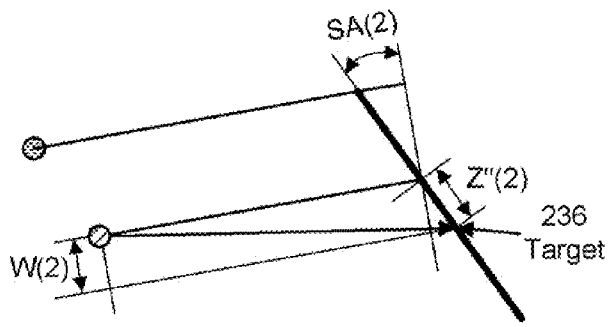
Formula 8-10
$Z''(2) = W(2) / \cos(SA(2))$
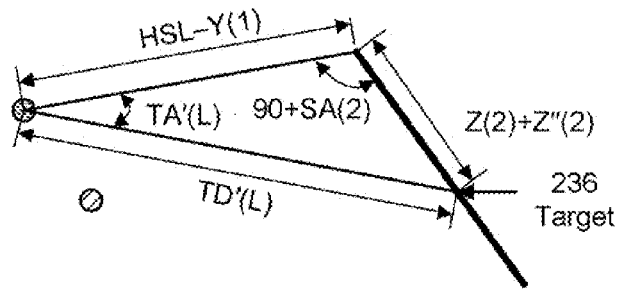
Formula 8-11
$TD'(L) = SQRT((HSL-Y(1))^2 + (Z(2)+Z''(2))^2 - 2*(HSL-Y(1))*(Z(2)+Z''(2))*\cos(90+SA(2)))$
Formula 8-12
$TA'(L) = \arcsin(Z(2)+Z''(2) * \sin(90+SA(2)) / TD'(L))$
FIG. 8E

SYSTEM, MODULE, AND METHOD FOR ILLUMINATING A TARGET ON AN AIRCRAFT WINDSHIELD

FIELD OF THE INVENTION

This invention pertains generally to the field of providing flight cues or visual aids to the pilot of an aircraft.

DESCRIPTION OF THE RELATED ART

During an approach to a runway, the image of the scene outside the aircraft presented on a head-down display ("HDD") unit is traditionally heading-referenced. That is, the heading of the aircraft determines the horizontal centering of the image. When a pilot is flying in instrument meteorological conditions, there is a point during the approach, e.g., reaching a decision altitude or minimum decent altitude, at which he or she must look up and decide whether he or she may continue the approach to landing or execute a missed approach. In a zero crosswind condition and assuming a straight-in approach is being performed, the pilot may look through the windshield directly ahead of the aircraft to locate the runway and/or the runway environment. In a zero crosswind condition, heading and track would align with one another.

If executing the same approach in a condition where there is a slight crosswind from the right, the aircraft may have to "crab" to the right. In such a condition, the heading would no longer be in alignment with the track, and the heading-based image would depict the runway left of center. When the pilot arrives at a decision altitude or minimum decent altitude and looks up to the outside scene, he or she would search to the left of the centerline to detect the runway and/or the runway environment.

If executing the same approach in a condition where there is a more severe crosswind from the right, the aircraft may "crab" more severely to the right. In such a condition, the heading/track alignment would further diverge, and the heading-based image would depict the runway further left of center. When the pilot arrives at a decision altitude or minimum decent altitude and looks up to view the outside scene through the windshield, it becomes more difficult for the pilot to determine where to look outside of aircraft to detect or locate the runway and/or the runway environment. Even though the pilot may know of the general location, the lateral or horizontal angle through which the pilot must steer his or her gaze is not easily discernable from the image presented on a HDD unit given the minification caused by the Field of View.

A solution to the crosswind problem is to provide a track-based image. That is, the track of the aircraft determines the horizontal centering of the image. In a track-based configuration, additional heading symbols may be placed in the image to provide an indication of the heading. Although the relationship between the runway and heading symbols may provide a cue to the pilot where to look for the runway environment, there may be a potential for confusion. For example, heading symbols would appear to the right of the runway, but the pilot would have to look to the left, possibly making it more difficult for the pilot to locate the runway and/or the runway environment as he or she transitions from looking head-down to looking head-up.

BRIEF SUMMARY OF THE INVENTION

The embodiments disclosed herein present at least one novel and non-trivial system, module, and method for illuminating a target on an aircraft windshield corresponding to a three-dimensional position data outside of an aircraft. The use of a beam illuminating a target on the windshield may be used to enhance a pilot's Situational Awareness of the runway environment and/or other aircraft traffic, especially in flight conditions with low visibility and strong crosswinds.

In one embodiment, a system is disclosed for illuminating a target on an aircraft windshield corresponding to a three-dimensional position outside of an aircraft. The system may comprise of a source of navigation data, a source of three-dimensional location data, a control processor, and an illumination source. After receiving the navigation data and three-dimensional location data of one or more targets, the control processor may determine an angle to each exterior target and a track angle. Then, the control processor may generate control data as a function of pitch, roll and/or yaw attitudes; angle(s) to each exterior target; track angle; and cockpit references. The control data may comprise data representative of vertical and/or lateral measurements which position a beam on a target of a windshield. Then, the control data may be provided to the illumination source, where the beam is positioned on the target of the windshield in response to the control data.

In another embodiment, a module is disclosed for illuminating a target on an aircraft windshield corresponding to a three-dimensional position outside of an aircraft. The module comprises an input communications interface, a control processor, and an output communications interface. The control processor may receive navigation data and three-dimensional location data of one or more targets via an input communications interface, and determine an angle to each exterior target and a track angle. Then, the control processor may generate control data as a function of pitch, roll and/or yaw attitudes; angle(s) to each exterior target; track angle; and cockpit references. The control data may comprise data representative of vertical and/or lateral measurements which position a beam on a target of a windshield. Then, the control processor may provide the control data to an illumination source via an output communications interface, where the beam may be positioned on the target of the windshield in response to the control data. A module could be, but is not limited to, a printed circuit board (either in whole or in part) installed in a line replaceable unit.

In another embodiment, a method is disclosed for illuminating a target on an aircraft windshield corresponding to a three-dimensional position outside of an aircraft. The method may comprise receiving navigation data and three-dimensional location data of one or more targets, determining an angle to each exterior target and a track angle, generating control data, and providing the control data to an illumination source. As embodied herein, the control data may be generated as a function of pitch, roll and/or yaw attitudes, angle(s) to each exterior target, track angle, and cockpit references; the control data may comprise data representative of vertical and/or lateral measurements which position a beam on a target of a windshield. As embodied herein, the control data enables an illumination source for the positioning of the beam on the target of the windshield in response to the control data.

The drawings of FIG. 3 present reference systems that may be employed in determining a target on a windshield through which a pilot may locate a runway outside the aircraft.

Figure 4A:
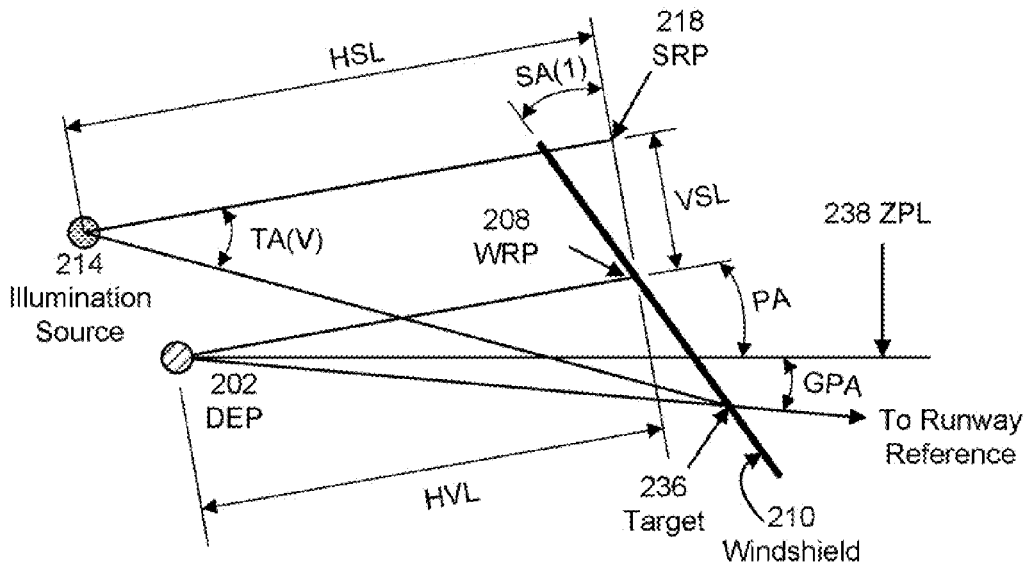
Figure 4B:
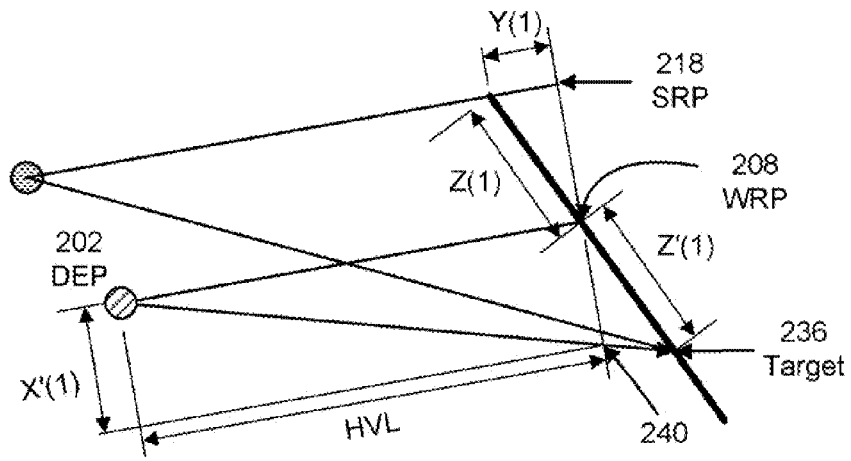

The drawings of FIG. 4 depict angles and lengths that could be used in a reference system from which a vertical target angle may be derived.

The drawings of FIG. 5 depict formulas which may be used for deriving a vertical target angle.

Figure 6A:
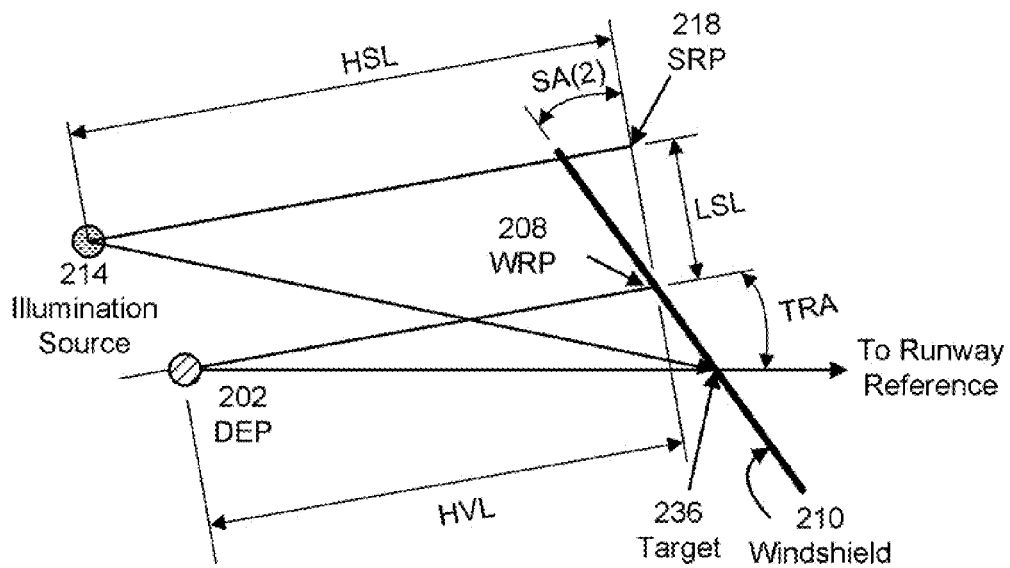
Figure 6B:
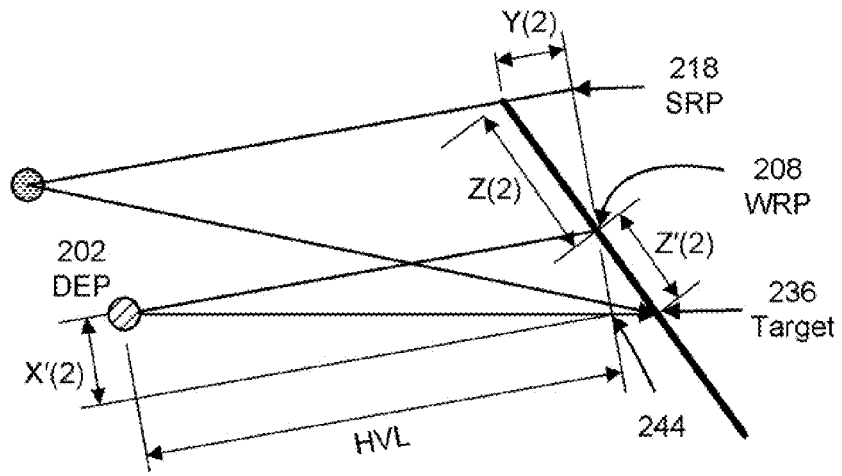

The drawings of FIG. 6 depict angles and lengths that could be used in a reference system from which a lateral target angle may be derived.

The drawings of FIG. 7 depict formulas which may be used for deriving a lateral target angle.

The drawings of FIG. 8 depict angles, lengths, and formulas that could be used in a reference system from which a lateral target angle and/or vertical target angle may be derived using roll attitude information.

Figure 9:
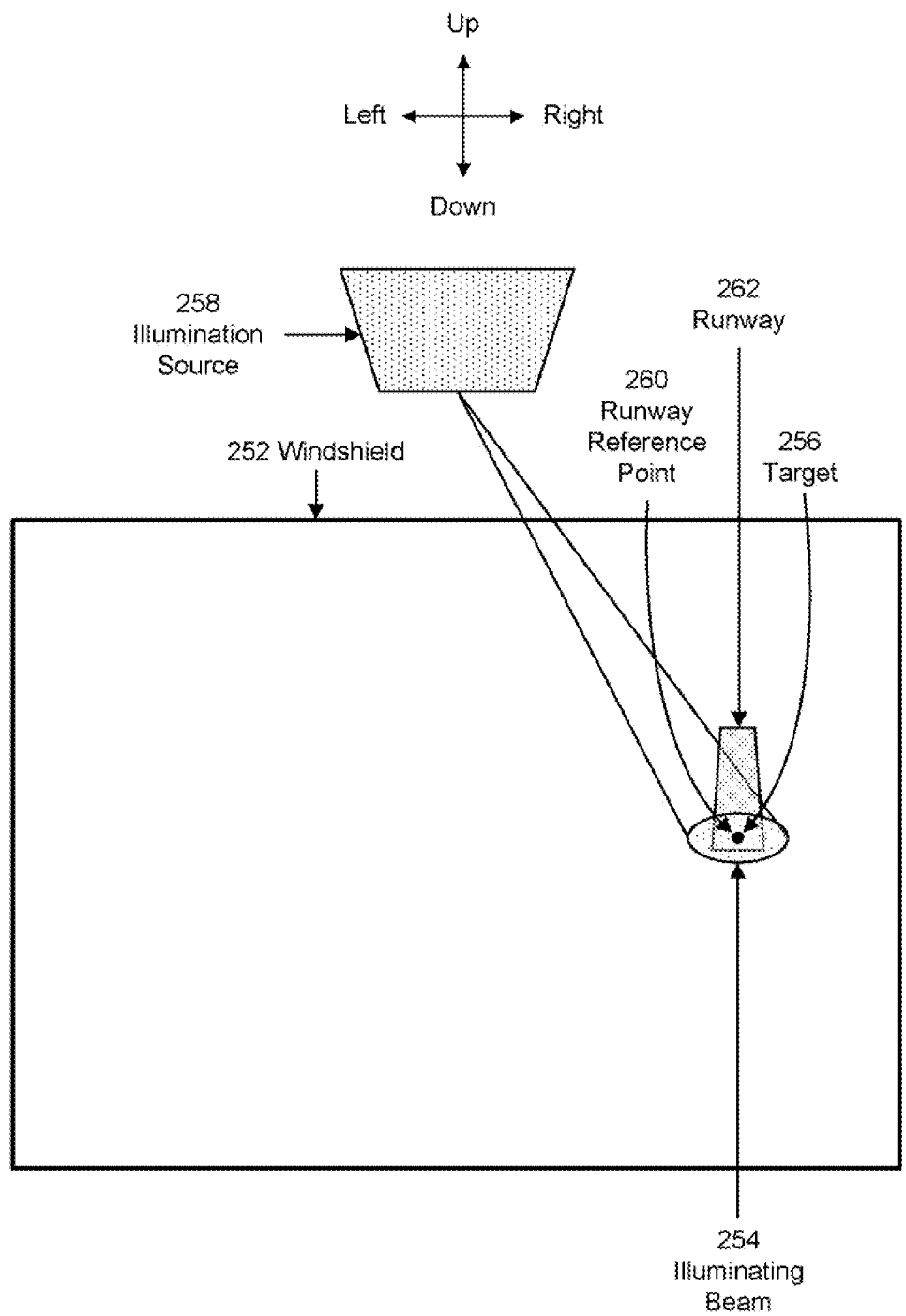

FIG. 9 provides an example of an illuminating beam being directed at a target of a windshield by an illumination source when viewed from a design eye position.

Figure 10:
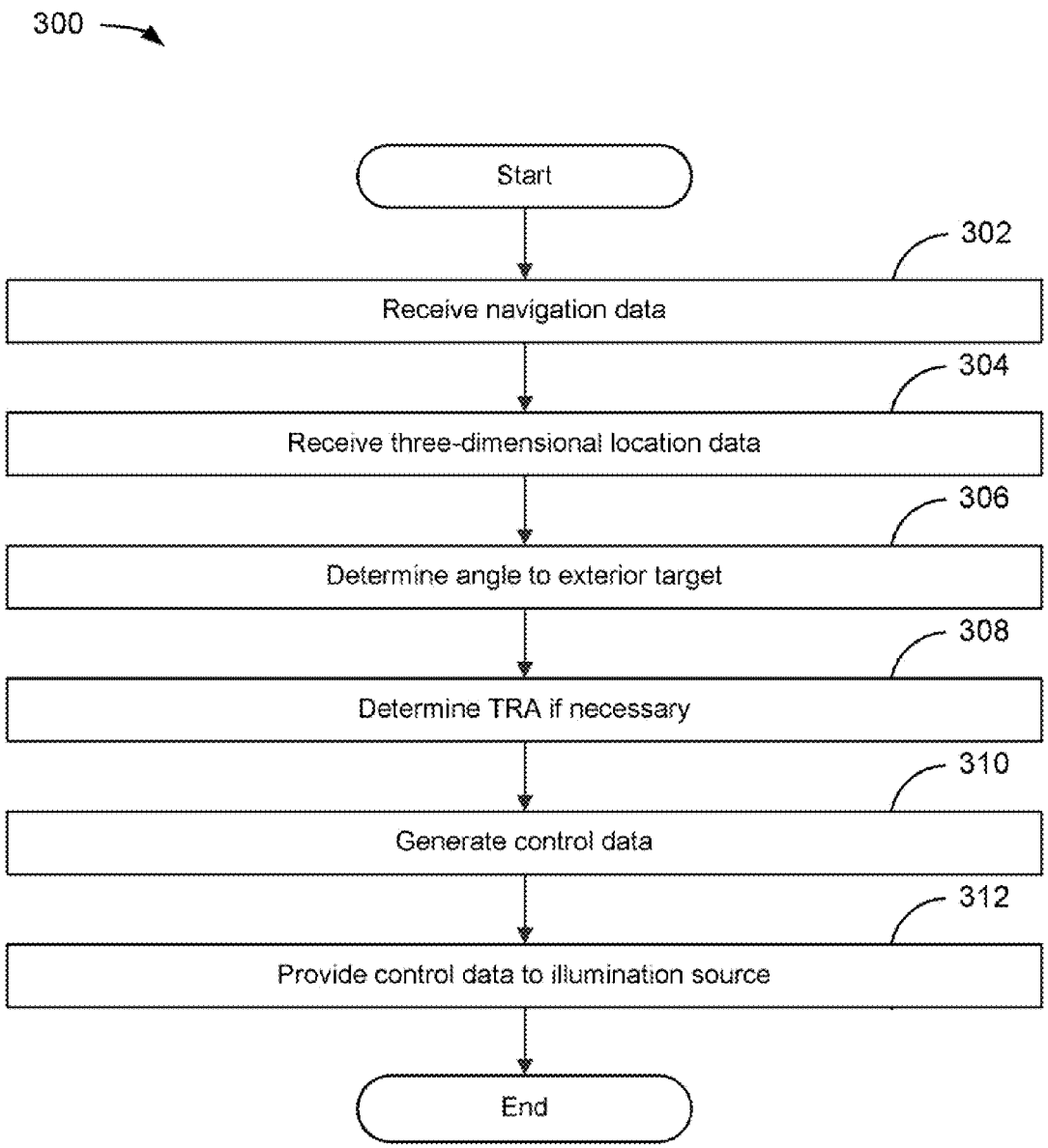

FIG. 10 depicts a flowchart of an example of a method for locating a runway through an aircraft windshield.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
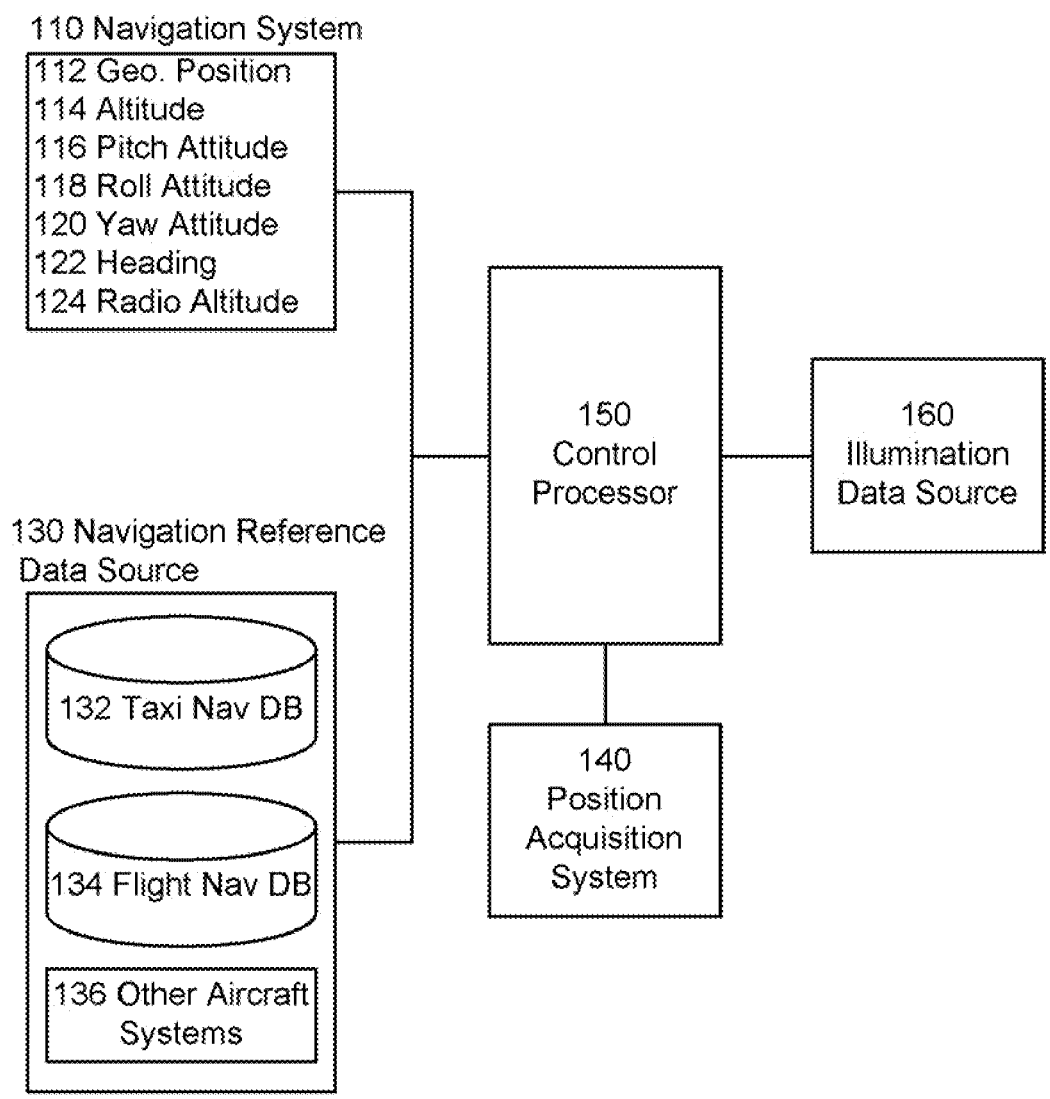
FIG. 1 depicts a block diagram of an aircraft windshield target illumination system.

FIG. 1 depicts a block diagram of an aircraft windshield target illumination system 100 suitable for implementation of the techniques described herein. The aircraft windshield target illumination system 100 of an embodiment of FIG. 1 includes navigation system 110, a navigation reference data source 130, a position acquisition system 140, a control processor 150, and an illumination source 160.

In an embodiment of FIG. 1, navigation system 110 comprises the system or systems that could provide navigation data information in an aircraft. It should be noted that data, as embodied herein for any source or system in an aircraft, could be comprised of any analog or digital signal, either discrete or continuous, which could contain information. As embodied herein, data and signal(s) are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

Navigation system 110 may include, but is not limited to, an air/data system, an attitude heading reference system, an inertial guidance system (or inertial reference system), a radio navigation system, and a global navigation satellite system (or satellite navigation system), all of which are known to those skilled in the art. As embodied herein, navigation system 110 could provide navigation data including, but not limited to, geographic position (or aircraft location) 112, altitude 114, pitch attitude 116, roll attitude 118, yaw attitude 120, heading 122, and radio altitude 124. As embodied herein, aircraft position comprises geographic position (e.g., latitude and longitude coordinates) and altitude, and direction may be derived from either geographic position, aircraft position, or both. As embodied herein, navigation system data may be provided to a control processor 150 for subsequent processing as discussed herein.

In an embodiment of FIG. 1, navigation reference data source 130 could comprise any source of runway data. Navigation reference data source 130 may include, but is not limited to, a taxi navigation database 132, a flight navigation database 134, and other aircraft systems 136.

A taxi navigation database 132, such as one described by Krenz et al in U.S. patent application Ser. No. 11/820,950, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

Taxi navigation database 132 could comprise an aerodrome mapping database ("AMDB") as described in the following document published by RTCA, Incorporated: RTCA DO-272A entitled "User Requirements for Aerodrome Mapping Information." RTCA DO-272A provides for aerodrome surface mapping requirements for aeronautical uses particularly on-board aircraft. It should be noted that any standards are subject to change. Those skilled in the art appreciate that standards in the aviation industry including, but not limited to, RTCA DO-272A and ARINC 424, may be subject to change with future amendments or revisions, that additional content may be incorporated in future revisions, and/or that other standards related to the subject matter may be adopted. The embodiments disclosed herein are flexible enough to include such future changes and/or adoptions of aviation standards.

A flight navigation database 134 may contain records which provide runway data. Flight navigation database 134 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, GNSS Landing Systems. Flight navigation database 134 could be provided by an aircraft system such as, but not limited to, a flight management system ("FMS"). It should be noted that, although it is presented herein as navigation reference data source 130, flight navigation database 134 is commonly made part of an FMS. For the embodiments disclosed herein, flight navigation database 134 is not limited to the database common to an FMS.

Other aircraft systems 136 could comprise a source of runway data. For example, both a terrain awareness and warning system ("TAWS") and an airspace awareness and warning system ("AAWS") may utilize airport data which may contain, in part, runway data. As embodied herein, navigation reference data source 130 could provide runway data to a control processor 150 for subsequent processing as discussed herein.

In an embodiment of FIG. 1, position acquisition system 140 could comprise any source for providing three-dimensional location information, i.e., aircraft position information, of other aircraft. There is a plurality of position acquisition systems 140 including, but not limited to, a Traffic Collision and Avoidance System ("TCAS"), an Automatic Dependent Surveillance-Broadcast system ("ADS-B"), and a Traffic Information Service system ("TIS-B"), each of which is known to those skilled in the art. In a TCAS, information of bearing, range, and altitude of each aircraft may be determined. In an ADS-B system, each ADS-B aircraft may determine its own position from such systems as a global navigation satellite system and/or FMS and automatically report its position without pilot input through periodic broadcasts. In a TIS-B System, aircraft position reports may be broadcasted.

It should be noted that, although the discussion below will be drawn to a location of an external target comprising a runway reference point and a glide path angle, the embodiments disclosed herein may be applied to any other sources which provide three-dimensional location information to an exterior target for which an angle to such target may be determined. The discussion drawn to a runway reference point and glide path angle is provided for the purpose of disclosing a specific embodiment and not for the purpose of providing a limitation.

In an embodiment of FIG. 1, control processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. Control processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, control processor 150 could be a processor(s) used by or in conjunction with any other system of the aircraft including, but not limited to, a processor(s) associated with navigation system 110 and illumination source 160, or any combination thereof.

Control processor 150 may be programmed or configured to receive as input data representative of information obtained from various systems and/or sources including, but not limited to, navigation system 110 and navigation reference data source 130. As embodied herein, the terms "programmed" and "configured" are synonymous. Control processor 150 may be electronically coupled to systems and/or sources to facilitate the receipt of input data; as embodied herein, operatively coupled may be considered as interchangeable with electronically coupled. Control processor 150 may be programmed or configured to execute the methods discussed in detail below. Control processor 150 may be programmed or configured to provide output data to various systems and/or units including, but not limited to, illumination source 160. Control processor 150 may be electronically coupled to systems and/or units to facilitate the providing of output data. It is not necessary that a direct connection be made; instead, such receipt of input data and the providing of output data could be provided through a data bus or through a wireless network.

In an embodiment of FIG. 1, illumination source 160 may be any source which could provide a beam of light to strike the inside face of an aircraft windshield. As embodied herein, illumination source 160 may provide a narrow beam and/or a wide beam, where such beam of light could strike the windshield in any pattern such as, but not limited to, an ellipse. For example, the major axis of an ellipse may be suitable for illuminating the width of a runway threshold and the minor axis for illuminating a runway reference point such as, but not limited to, a landing threshold point. Illumination source 160 may be capable of being responsive to the control data generated by control processor 150, where such control data comprises beam positioning data for positioning a beam on a target of a windshield. As embodied herein, any suitable source for providing this functionality may be used including, but not limited to, a digital light processing ("DLP") device.

The drawings of FIG. 2 depict exemplary illustrations of an image on a tactical display unit depicting an electronic artificial horizon with symbology providing tactical flight information. Although there may be a resemblance to a classic electronic primary flight display ("PFD") that provides a blue/brown sky/ground artificial horizon, the tactical display unit as embodied herein includes any head-down display ("HDD") unit and/or a head-up display ("HUD") unit that could present or depict synthetic and/or enhanced sky/terrain artificial horizon generated by vision systems including, but not limited to, a synthetic vision system ("SVS"), an enhanced vision system ("EVS"), and/or a combined SVS-EVS. Although the discussion herein will be drawn to illustrations using a tactical display unit resembling a PFD, the embodiments herein are not limited solely to PFDs but include any display unit that could provide tactical flight information.

Figure 2A:
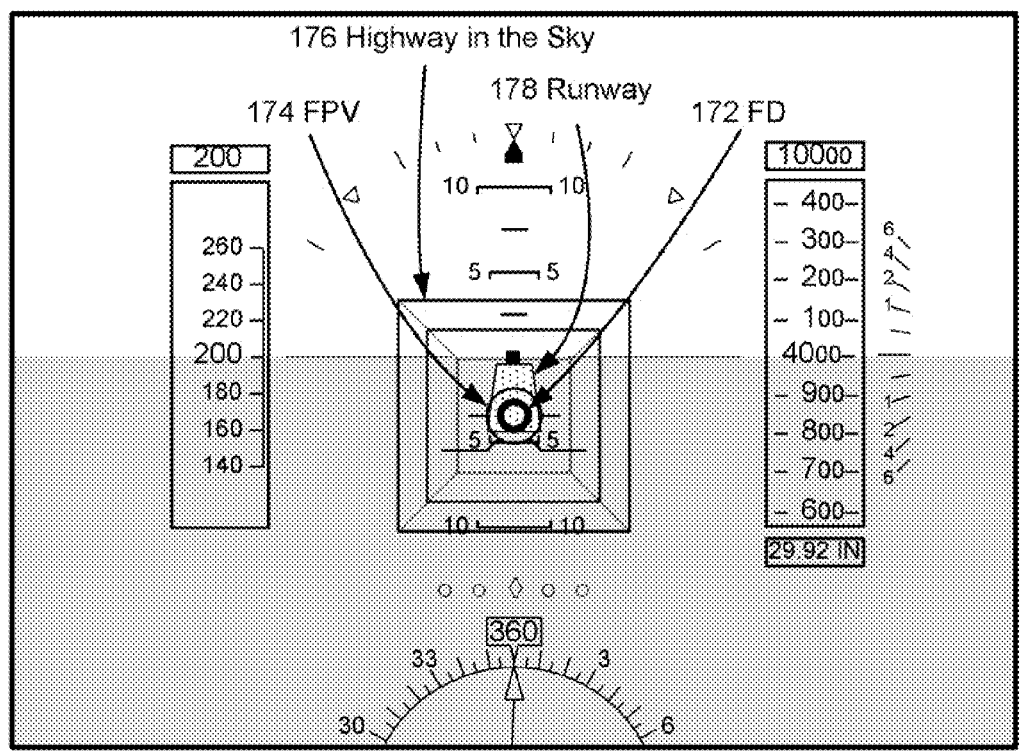
FIG. 2A provides an exemplary heading-based depiction of an aircraft approaching a runway where there is zero crosswind.

As embodied herein, tactical flight information displayed on a tactical display unit could be information relevant to the instant or immediate control of the aircraft, whether the aircraft is in flight or on the ground. As shown in FIG. 2A, a tactical display unit could display the same information found on a PFD, such as "basic T" information (i.e., airspeed, attitude, altitude, and heading). Also, a tactical unit display could display symbology representative of an FD 172, a flight path vector ("FPV") 174, and a highway in the sky ("HITS") pathway 176, each of which are known to those skilled in the art. Included in the display is a runway 178. The depictions of FD 172, flight path vector 174, HITS pathway 176, and runway 178 will be depicted in the remaining drawings of FIG. 2.

A plurality of other symbologies may be depicted on a tactical display unit including, but not limited to, those provided in the drawings of FIG. 2. Those skilled in the art understand that a tactical display unit is typically designed to provide flexible symbology configurations which may be tailored to the desired configuration specified by a buyer or user of the aircraft. Because the indications or information shown in the drawings of FIG. 2 are well-known to those skilled in the art, a discussion of the other information is not provided herein.

As shown in FIG. 2A, FD 172 symbology is depicted as a circle with a thick or heavy line, and FPD 174 symbology is depicted as an airplane with gull wings. In order to distinguish between FD 172 and FPV 174 in the remaining discussion, FD 172 will be depicted with thicker border lines. A HITS pathway 176 may be configured for more than one type of design. As illustrated in FIG. 2A, the HITS pathway 176 has been configured as sequentially-connected squares for depicting a flight pathway or tunnel. Although the dimensions of each square may differ, they could represent the same dimensions of airspace as the pathway extends outwardly from the aircraft and towards the horizon (or into the scene in front of the aircraft); as such, the pathway appears to narrow or taper as the squares appear to become smaller, thereby providing the appearance of flight into a tunnel. As embodied herein, the largest square may represent a proximal end of a HITS pathway closest to the aircraft, and the smallest square may represent a distal end of a HITS pathway farthest from the aircraft.

Those skilled in the art understand that other symbologies comprising different shapes, colors and/or forms including, but not limited to, a donut, a bull's-eye, horizontal and/or vertical bars, or other types of wings may be used. The embodiments herein are not limited solely to the depicted symbologies but include any symbology suitable for the respective function.

As embodied in FIG. 2A, an illustration of an approach to a runway with zero crosswind is depicted. The FPV is conformal and positioned over the threshold of the runway, and a pilot could use the HITS pathway as a visualization of the path to the runway. If the approach to the runway is being accomplished as in instrument meteorological conditions, a pilot reaching an altitude for deciding whether to continue with the approach to landing ("the decision altitude") would have to look up from the HDD unit and be able to locate indications of the runway environment including, but not limited to, runway lights and/or runway threshold/markings. In the illustration of FIG. 2A with zero crosswind, the runway environment would appear directly ahead through the pilot's windshield.

Figure 2B:
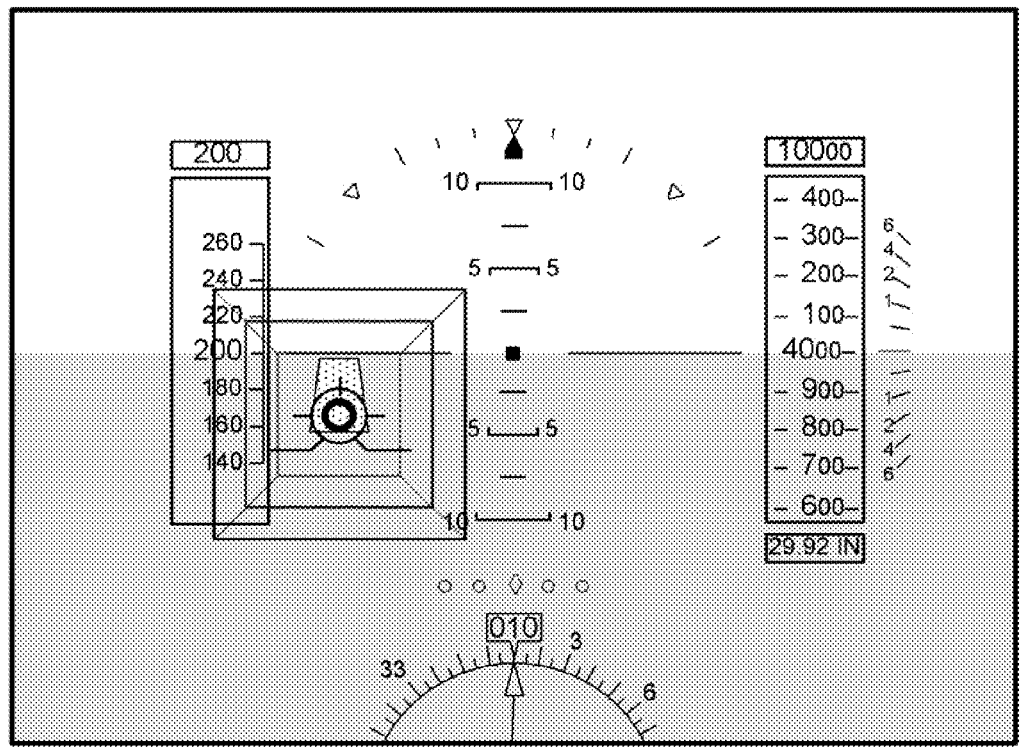
FIG. 2B provides an example of a heading-based depiction of an aircraft approaching a runway where there is a slight crosswind.

As embodied in FIG. 2B, an illustration of an approach to a runway with a slight crosswind from the right is depicted. The depiction on the tactical unit display is heading-based, i.e., referenced to the heading of the aircraft. As a result, the FPV, FD, HITS pathway, and runway are shifted to the left of center. The FPV is still conformal and positioned over the threshold of the runway. With a slight crosswind, a pilot is still able to use the FPV and the FD for guidance to the runway with the HITS pathway serving as a cross-reference. Upon reaching the decision altitude, a pilot would have to look up from the HDD unit and search outside of the aircraft to the left of the aircraft centerline to locate the runway environment. In other words, the workload associated with the transition between head-down to head-up flying and the locating of the runway environment has been increased, and situational awareness has been decreased.

Figure 2C:
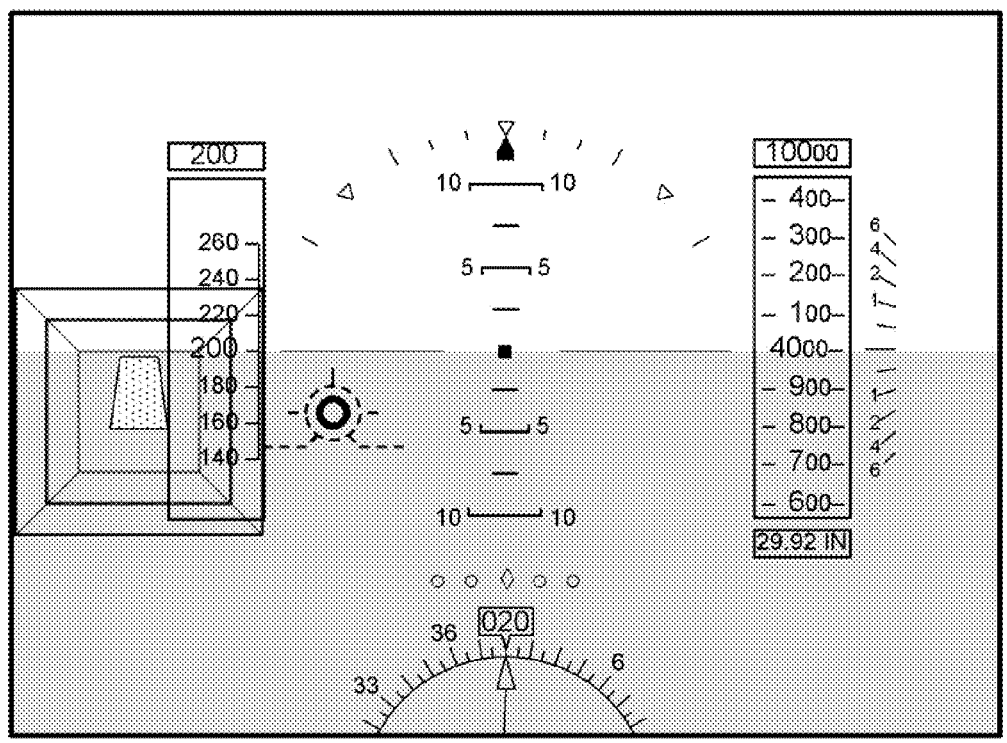
FIG. 2C provides an example of a heading-based depiction of an aircraft approaching a runway where there is a severe crosswind.

As embodied in FIG. 2C, an illustration of an approach to a runway with a more severe crosswind from the right is depicted. The depiction on the tactical unit display is heading-based. As a result, the runway and the HITS pathway have shifted further to the left; however, the FPV is limited to its lateral displacement (as indicated by the dashed outline) and has become non-conformal. The FD may still be used for guidance by placing the FPV over the FD, but the use of the HITS pathway will not be possible to cross-reference the FD guidance and the FPV position with a visualization of the HITS. Upon reaching the decision altitude, a pilot would have to look up from the HDD unit and search further to the left, making it more difficult for the pilot to determine where to look outside of the aircraft to locate the runway environment. In other words, the workload associated with the transition between head-down to head-up flying and the locating of the runway environment has been further increased, and situational awareness has been further decreased. Even though the pilot knows that the runway environment is to the left, the lateral angle through which the pilot must steer his or her gaze is not easily discernable from the displayed image given the minification caused by the Field of View.

Figure 2D:
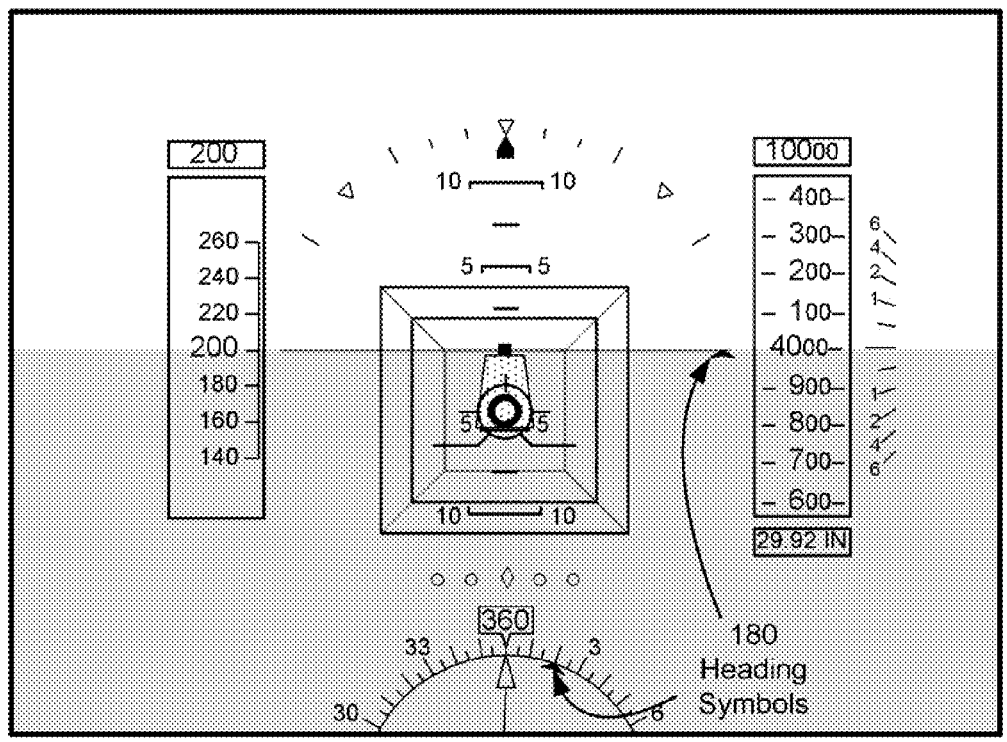
FIG. 2D provides an example of a track-based depiction of an aircraft approaching a runway where there is a severe crosswind.

As embodied in FIG. 2D, an illustration of an approach to a runway is depicted with the same severe crosswind of FIG. 2C. Instead of a depiction that is heading-based, the depiction of FIG. 2D is track-based, i.e., referenced to the track of the aircraft. As shown by the symbology, additional heading symbols 180 have been placed on the HSI compass and the horizontal line. With a track-based tactical display unit, the FPV would be centered laterally and the HITS pathway would line up in the center of the display when the aircraft is on the path. Although the relationship between the runway and heading symbols may provide a cue to the pilot where to look for the runway environment, there may be a potential for confusion. For example, heading symbols 180 appear to the right of the runway, but the pilot would have to look to the left.

Figure 3A:
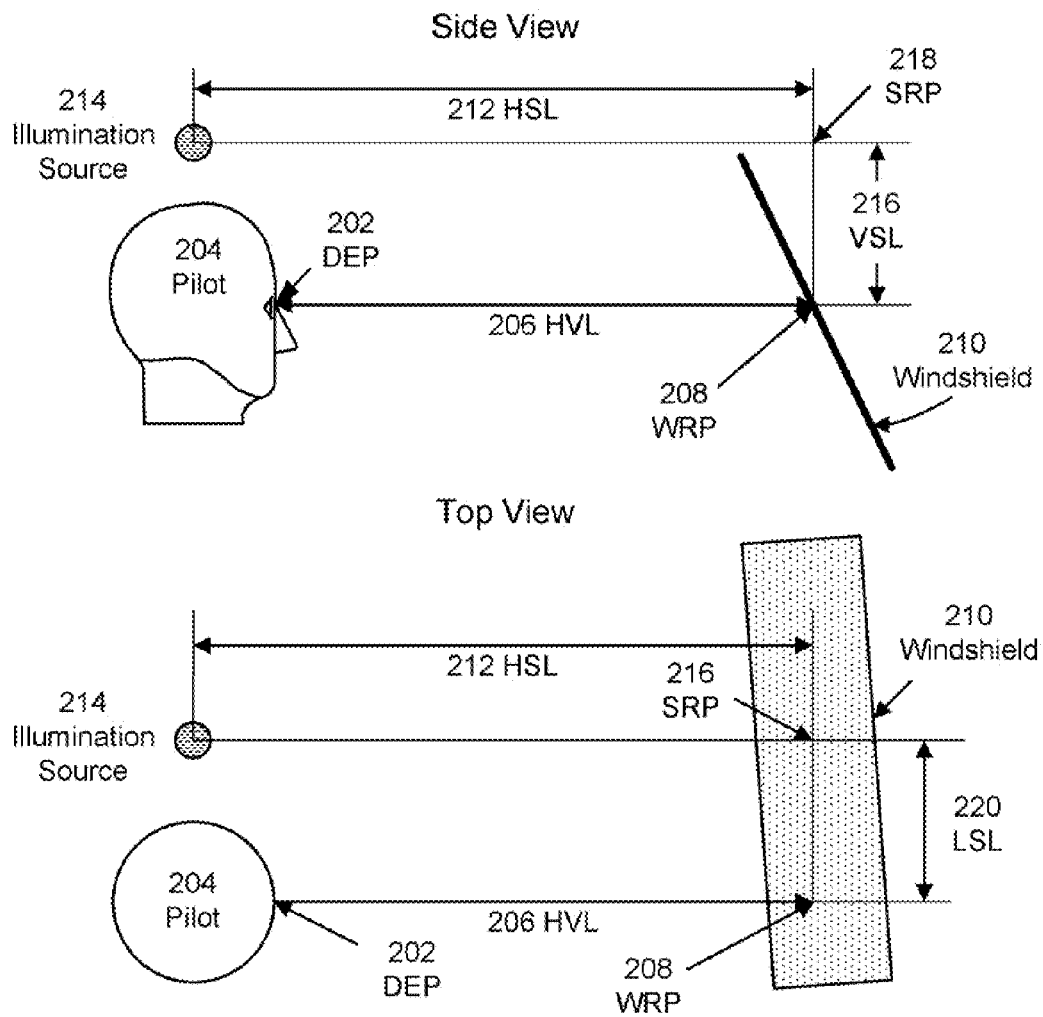

The drawings of FIG. 3 depict cockpit reference systems which may be employed in determining a target on the windshield through which the pilot of aircraft may locate the runway outside of the aircraft, where such area could represent the target of an illumination source. FIG. 3A comprises a side view and a top view of a pilot located in a cockpit of an aircraft. A design eye position or point ("DEP") 202 may be a reference datum point based on the eye location of pilot 204. DEP 202 may be designated by an aircraft and/or component manufacturer and may represent an ideal but notional location of the pilot's view.

A horizontal vision line ("HVL") 206 may be a reference line passing through DEP 202 and parallel to the longitudinal axis of the aircraft. The length of HVL 206 may be the distance between DEP 202 and a windshield reference point ("WRP") 208 of a windshield 210 in front of pilot 204, and the direction of the HVL 206 may be measured by heading 122. For the purposes of discussion herein, a horizontal source line ("HSL") 212 may be a reference line passing through an illumination source 214 and parallel to the longitudinal axis of the aircraft, and a vertical source line ("VSL") 216 may be a reference line passing through WRP 208 and parallel to the vertical axis of the aircraft. The length of HSL 212 may be the distance between illumination source 214 and a source reference point ("SRP") 218, and the length of VSL 216 may be the distance between WRP 208 and SRP 218, where SRP 218 is a point where HSL 212 and VSL 216 intersect. A lateral source line ("LSL") 220 may be a reference line passing through WRP 208 and parallel to the lateral axis of an aircraft. The length of LSL 220 may be the distance between WRP 208 and SRP 218.

Figure 3B:
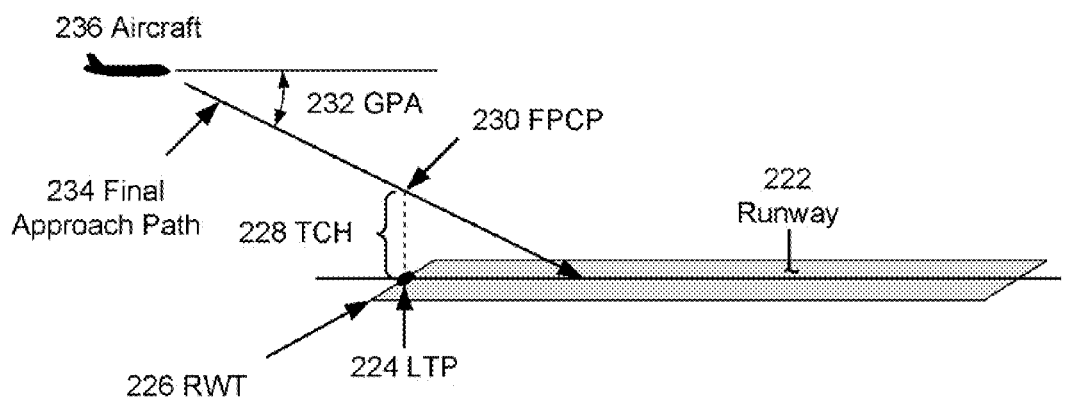

The drawings of FIGS. 3B and 3C depict some of the reference points and definitions that may be associated with a runway 222. Data representative of these points and definitions for one or more runways could be contained in a navigation reference database 130. A Landing Threshold Point ("LTP") 224 (which could also be called a runway threshold point) may be a three dimensional point at an intersection of the centerline of runway 222 and a runway threshold ("RWT") 226; the direction of a runway centerline from LTP 224 may be measured in reference to magnetic north using a magnetic bearing. In one embodiment, LTP 224 could be defined using latitude, longitude, and elevation derived from government sources. In another embodiment, a geoid height could be included in definition, where a geoid could be considered to be an equipotential surface that is everywhere normal to the direction of gravity and would coincide with the mean ocean surface of the Earth, if the oceans were in equilibrium, at rest, and extended through the continents. The surface of a geoid may be approximated using a mathematically-defined reference ellipsoid employed in a geodetic system. The height of a geoid ("GH") may be measured relative to the ellipsoid, and it may be positive if it is above the reference ellipsoid and negative if it is below.

Geodetics or geodesy is a scientific discipline dealing with the measurement and representation of the Earth. An example of a geodetic system, provided for the purpose of illustration and not limitation, is a World Geodetic System ("WGS"). A WGS could be used, for example, in a GNSS to provide a frame of reference or coordinate system of the Earth. WGS's have evolved with past refinements made possible due to additional global data from precise and accurate measurements and will likely further evolve with future refinements. Those skilled in the art can appreciate the adaptability of future refinements of the WGS or any other geodetic system to the embodiments disclosed.

A Threshold Crossing Height ("TCH") 228 may be the height above LTP 224 assigned to a runway. A Flight Path Control Point ("FPCP") 230 may be an imaginary point above LTP 224 at TCH 228. A glidepath angle ("GPA") 232 may be the angle of a final approach path ("FAP") 234 (or glidepath) flown by an aircraft 236 relative to a runway reference point from which GPA 232 may be mathematically determined. The runway reference point may be designated by a manufacturer or end-user. For example, the runway reference point could be FPCP 230 as shown in FIG. 3B. In another example, the runway reference point could be LTP 224. GPA 232 may be determined using the geographic position and altitude of the aircraft, and the geographic position and elevation of the runway reference point.

The drawings of FIG. 4 depict the angles and lengths that could be used in the reference system of FIG. 3A from which a vertical target angle ("TA(V)") may be derived, where such TA(V) may measure an angle formed in the vertical plane between the illumination source 214, SRP 218, and target 236 on windshield 210. Target 236 may represent a point on windshield 210 which intersects with a line formed between DEP 202 and the runway reference point. A zero pitch line ("ZPL") 238 may be a stationary reference line passing through DEP 202 and parallel to the longitudinal axis of the aircraft when the pitch attitude ("PA") is zero. Windshield slant angle ("SA(1)") may be a measurement of the angle of the windshield 210 offset from VSL 216, and GPA may be a measurement of GPA 232. HVL, HSL, and VSL may be lengths of HVL 206, HSL 212, and VSL 216, respectively.

By applying laws of trigonometry, TA(V) may be determined. It should be noted that the application of trigonometry presented herein is illustrative of how a determination of TA(V) may be made, but the embodiments herein are not limited to the approach as presented.

Referring to FIG. 3A, the intersection of HSL 212 and VSL 216 form a right angle. Because the angle of SA(1) is known, the lengths Z(1) and Y(1) shown in FIG. 4B may be determined using Formula 5-1 shown in FIG. 5. A right angle may be formed between HVL 206 and a line extending downward from WRP 208 to point 240, where the line is parallel to the vertical axis of the aircraft. Because HVL is known, the length X'(1) may be determined using Formula 5-2 shown in FIG. 5, where X'(1) is a measurement between WRP 208 and point 240, where point 240 is the intersection point of the downwardly extending line and a line formed between DEP 202 and target 236. Note that degrees is the unit of measurement for the angles used in the formulas presented herein.

Figure 4C:
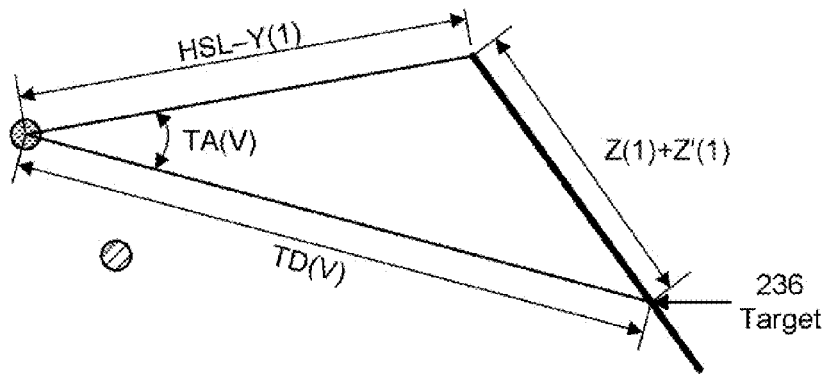

After the determination of X'(1), the law of sines may be applied to determine length Z'(1). Because PA, GPA, and SA(1) are known, length Z'(1) may be determined using Formula 5-3 shown in FIG. 5. Referring to FIG. 4C, the law of cosines may be applied to determine the length of vertical target distance ("TD(V)") using Formula 5-4 of FIG. 5. Once TD(V) has been determined, the law of sines may be applied to determine the angle TA(V) using Formula 5-5 shown in FIG. 5.

The drawings of FIG. 6 depict the angles and lengths that could be used in the reference system of FIG. 3A from which a lateral target angle ("TA(L)") may be derived, where such TA(L) may measure an angle formed in the lateral plane between illumination source 214, SRP 218, and target 236 on windshield 210. Target 236 may represent a point on windshield 210 which intersects with a line formed between DEP 202 and the runway reference point. TRA may be measurement between the direction to the runway reference point and heading 122. Windshield slant angle ("SA(2)") may be a measurement of the angle of the windshield 210 offset from LSL 220. As stated above, HVL, HSL, and LSL may be lengths of HVL 206, HSL 212, and LSL 220, respectively.

By applying laws of trigonometry, a similar approach may be taken in the determination of TA(L) that was taken for TA(V). As was noted above, the application of trigonometry presented herein is illustrative of how a determination of TA(L) may be made, but the embodiments herein are not limited to the approach as presented.

Referring to FIG. 3A, the intersection of HSL 212 and LSL 220 form a right angle. Because the angle of SA(2) is known, the lengths Z(2) and Y(2) of FIG. 6B may be determined using Formula 7-1 shown in FIG. 7. A right angle may be formed between HVL 206 and a line extending inward from WRP 208 to point 244, where the line is parallel to the lateral axis of the aircraft. Because HVL is known, the length X'(2) may be determined using Formula 7-2 shown in FIG. 7, where X'(2) is a measurement between WRP 208 and point 244, where point 244 is the intersection point of the inwardly extending line and a line formed between DEP 202 and target 236.

Figure 6C:
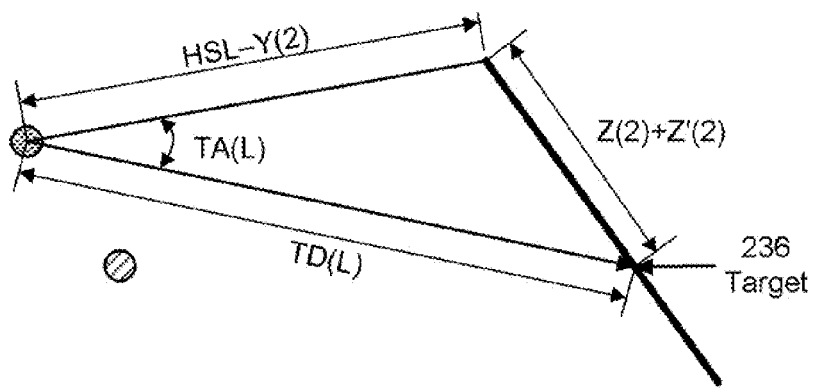

After the determination of X'(2), the law of sines may be applied to determine length Z'(2). Because TRA and SA(2) are known, length Z'(2) may be determined using Formula 7-3 shown in FIG. 7. Referring to FIG. 6C, the law of cosines may be applied to determine the length of lateral target distance ("TD(L)") using Formula 7-4 of FIG. 7. Once TD(L) has been determined, the law of sines may be applied to determine the angle TA(L) using Formula 7-5 shown in FIG. 7.

The drawings of FIG. 8 depict the angles and lengths that could be used in the reference system of FIG. 3A from which a vertical target angle ("TA'(V)") and a lateral target angle ("TA'(L)") may be derived, where TA'(V) and TA'(L) may include a bank or roll component about the longitudinal axis of an aircraft. TA'(V) may measure an angle formed in the vertical plane between the illumination source 214, SRP 218, and target 236 on windshield 210, and TA'(L) may measure an angle formed in the lateral plane between the illumination source 214, SRP 218, and target 236 on windshield 210.

Referring to FIG. 8A, the length Z'(1) was determined previously using Formula 5-3. Because the angle SA(1) is known, the length V(1) may be determined using Formula 8-1 shown in FIG. 8A. Similarly, Z'(2) was determined previously using Formula 7-3. Because the angle SA(2) is known, the length W(1) may be determined using Formula 8-2 shown in FIG. 8A.

Figures 8B, 8C:
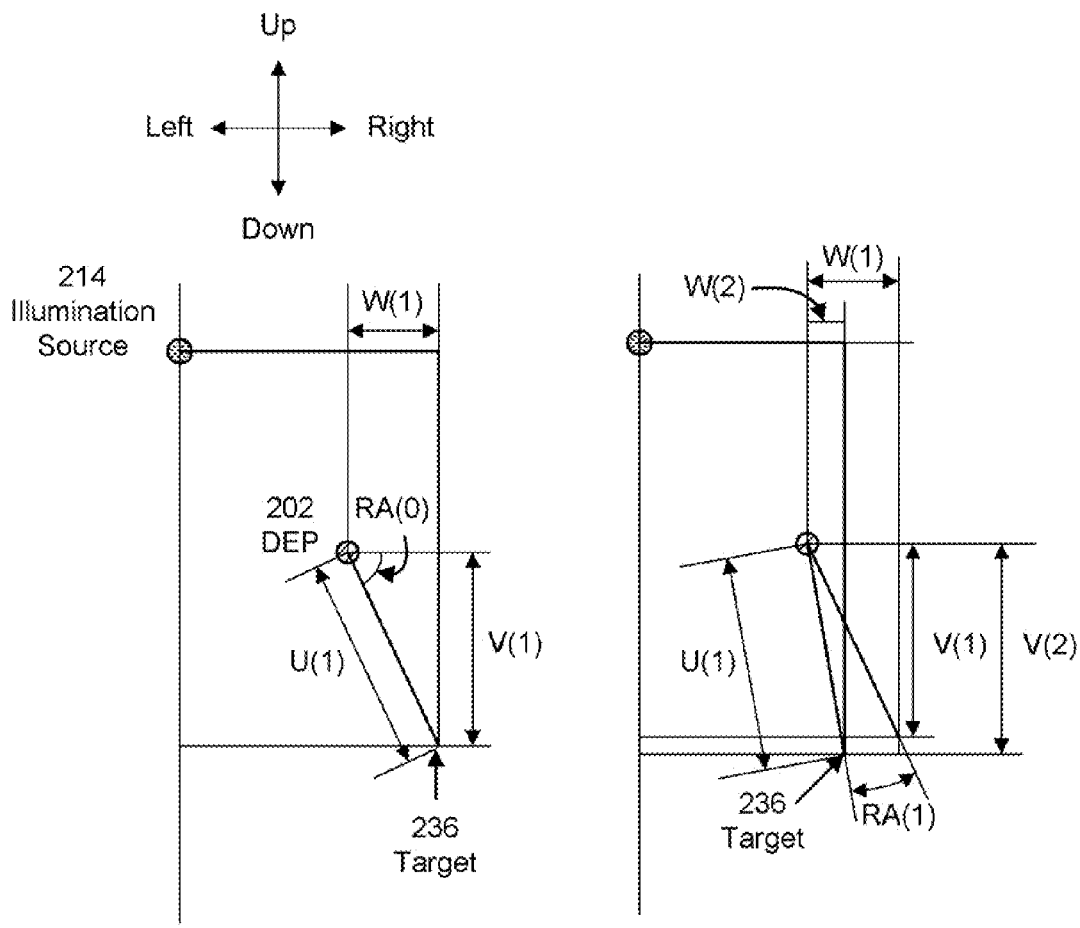

Referring to FIG. 8B, the lengths V(1) and W(1) may be used to determine the length U(1) using Formula 8-3, where U(1) may be the distance between DEP 202 and target 236. Also, RA(0) may be determined using Formula 8-4, where RA(0) may be the angle between DEP 202 and target 236 without a bank or roll component. Referring to FIG. 8C, a bank or roll component has been introduced. Because roll attitude is known from the input of roll attitude 188, the lengths V(2) and W(2) may be determined using Formulas 8-5 and 8-6, respectively.

Referring to FIG. 8D, the length W(2) may be used to determine the length Z"(1) using Formula 8-7. Then, the law of cosines may be applied to determine the length TD'(V) using Formula 8-8. Once TD'(V) has been determined, the law of sines may be applied to determine the angle TA'(V) using Formula 8-9.

Referring to FIG. 8E, the length V(2) may be used to determine the length Z"(2) using Formula 8-10. Then, the law of cosines may be applied to determine the length TD'(L) using Formula 8-11. Once TD'(L) has been determined, the law of sines may be applied to determine the angle TA'(L) using Formula 8-12.

It should be noted that an additional input of yaw attitude 120 could be provided to control processor 150, especially when heading could be affected during banking or rolling maneuvers. In such an embodiment, similar techniques as those discussed above may be employed equally to determine an offsetting effect to a vertical target angle and/or horizontal target angle.

The advantages and benefits of the embodiments discussed herein may be illustrated by showing in FIG. 9 an example of the area on the windshield through which the pilot of the aircraft may locate the runway outside of the aircraft, where such area could represent the area surrounding the target of an illumination source. It should be noted that, although an elliptical shape is illustrated in FIG. 9 surrounding a target, a pinpoint or any other shape may be used to illuminate the target and/or surrounding area.

FIG. 9 provides an example of a pilot's view from a DEP of the scene outside of the windshield 252. As illustrated, an illuminating beam 254 is being directed at a target 256 by an illumination source 258, where target 256 appears to coincide with a runway reference point 260 of runway 262 when viewed from a DEP. As embodied herein, illuminating source 258 may control illuminating beam 254 to target 256 by positioning of the beam both vertically and laterally corresponding to the angular values of TA(V) and TA(L), respectively, where illuminating source 258 is responsive to control data representative of angular values of TA(V) and TA(L) determined without a bank or roll component. If a bank or roll component has been included, illuminating source 258 may control the illuminating beam 254 to target 256 by positioning of the beam both vertically and laterally corresponding to the angular values of TA'(V) and TA'(L), respectively, where illuminating source 258 is responsive to control data representative of angular values of TA'(V) and TA'(L). Such control data may be determined by control processor 150 configured for executing control formulas which could include, but are not limited to, the formulas discussed above.

FIG. 10 depicts a flowchart 300 of an example of a method for illuminating a target on an aircraft windshield. The flowchart begins with module 302 with the receiving of navigation data. The navigation data representative of aircraft position and heading could be received by control processor 150 from a source of navigation data such as, but not limited to, navigation system 110. In an additional embodiment, data representative of TRA could be received. In an additional embodiment, data representative of pitch attitude and/or roll attitude could be received.

The flowchart continues with module 304 with the receiving of three-dimensional location data of one or more exterior targets from a corresponding source. In one embodiment, data from a navigation reference data source 130 that is representative of a runway reference point could be received by control processor 150, where such runway reference point may be configurable and/or designated by a manufacturer or end-user. For example, the runway reference point could be an LTP. In another example, the runway reference point could be an FPCP, which itself could be determined by receiving LTP and TCH. The runway reference point may be a point from which the GPA may be mathematically determined. In another embodiment, aircraft position data of one or more aircraft targets could be received from position data acquisition source 140 including, but not limited to, a TCAS, an ADS-B system and/or TIS-B system.

The flowchart continues with module 306 with the determining of an angle to each exterior target. In an embodiment which employs a navigation reference data source 130, the GPA may be determined using aircraft position data and the runway reference point data. In an embodiment which employs a position data acquisition source 140, an angle to an exterior target may be determined using the aircraft position data and position data for the external aircraft.

The flowchart continues with module 308 with the determining of a TRA if not included in the receiving of navigation data. In one embodiment, TRA may be determined using heading and ground track data, where ground track data may be received from a navigation data source. In another embodiment, TRA may be determined using heading and aircraft geographic location data contained in and/or embedded with the aircraft position data.

The flowchart continues with module 310 with the generating of control data. The control data may be generated by control processor 150 as a function of a plurality of cockpit references, the angle to each exterior target, and TRA. The control data may comprise data representative of lateral target measurements for laterally positioning a beam for each target of an aircraft windshield. As embodied herein, each target may correspond to a position on the aircraft windshield through which a line of sight passes between the DEP and the runway reference point. If not configured for vertical positioning, a beam could be adjusted to provide a vertically wider illumination. If so, the beam may direct the pilot's scan to the lateral location, where his or her search is limited and/or confined to a vertical zone only.

In an additional embodiment, the function could include pitch attitude 116. If so, then the control data could include data representative of vertical target angular measurements for vertically positioning a beam on each target of an aircraft windshield corresponding to the inclusion of the pitch attitude data. In an additional embodiment, the function could include roll attitude 118. If so, then the control data could include data representative of lateral target measurements and/or vertical target for measurements corresponding to the inclusion of the roll attitude data. In addition, the function could include yaw attitude 120 in flight attitudes when heading would not coincide with the yaw attitude including, but not limited to, banking or rolling maneuvers.

In one embodiment herein, a plurality of cockpit references could comprise a horizontal vision line, a vertical source line, a horizontal source line, and a lateral source line. In another embodiment, the function could include windshield slant angles SA(1) and SA(2). It should be noted that distance corrections provided by SA(1) and SA(2) could be considered negligible if such angles are relatively small. If so, the a manufacturer or end-user may elect to configure the beam for illuminating an approximate target location.

The flowchart continues with module 312 with the providing of the control data to an illumination source. The illumination source may be responsive to the control data by positioning a beam on a target of an aircraft windshield, such that the position of the beam corresponds on the position on the windshield through which a pilot will locate the runway outside of the aircraft. The illumination source could have a default setting. For example, the default setting could be set to illuminate the WRP. If no vertical target measurement is provided, then the illumination source could be set to illuminate in one direction. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements as fall within the true spirit and scope of the present invention.

What is claimed is:

1. A system for illuminating a target on an aircraft windshield corresponding to a three-dimensional location outside of an aircraft, such system comprising:
    a source of navigation data;
    a source of three-dimensional location data;
    a control processor configured to
        receive navigation data representative of at least aircraft position and heading,
        receive three-dimensional location data of at least one exterior target,
        determine an angle to each exterior target,
        determine a track angle if not included in the navigation data,
        generate control data as a function of a plurality of cockpit references, the angle to each exterior target, and the track angle, wherein the control data comprises data representative of a lateral target measurement for laterally positioning a beam on an aircraft windshield target for each exterior target, and
        provide the control data to an illumination source; and
    the illumination source configured to
        receive the control data, and
        position each beam on the aircraft windshield target in response to the control data, whereby the aircraft windshield target corresponds to the position through which a pilot can observe a visual object corresponding to each exterior target.

2. The system of claim 1, wherein the source of three-dimensional location data comprises a navigation reference data source.

3. The system of claim 1, wherein the source of three-dimensional location data comprises a position data acquisition source.

4. The system of claim 1, wherein the control processor is further configured to
    receive data representative of pitch attitude, and
    include the pitch attitude in the function generating of the control data, whereby the control data includes data representative of vertical target measurement for vertically positioning the beam on the target.

5. The system of claim 4, wherein the control processor is further configured to
    receive data representative of roll attitude, yaw attitude, or both, and
    include the roll attitude, yaw attitude, or both in the function generating of the control data.

6. The system of claim 1, wherein the control processor is further configured to
    receive data representative of roll attitude, yaw attitude, or both, and
    include the roll attitude, yaw attitude, or both in the function generating of the control data.

7. The system of claim 6, wherein control data includes data representative of a vertical target measurement for vertically positioning a beam on a target of an aircraft windshield.

8. The system of claim 1, wherein the function includes a first windshield slant angle, a second windshield slant angle, or both.

9. A module for illuminating a target on an aircraft windshield corresponding to a three-dimensional location outside of an aircraft, such module comprising:
    an input communications interface to facilitate the receiving of data by a processor from at least one data source;
    a control processor configured to
        receive navigation data representative of at least aircraft position and heading,
        receive three-dimensional location data of at least one exterior target,
        determine an angle to each exterior target,
        determine a track angle if not included in the navigation data,
        generate control data as a function of a plurality of cockpit references, the angle to each exterior target, and the track angle, wherein the control data comprises data representative of a lateral target measurement for laterally positioning a beam on an aircraft windshield target for each exterior target, and
        provide the control data to an illumination source for positioning each beam on the aircraft windshield target in response to the control data corresponding to a position through which a pilot can observe a visual object corresponding to each exterior target; and
    an output communications interface to facilitate the providing of the control data set to the illumination source.

10. The module of claim 9, wherein the source of three-dimensional location data comprises a navigation reference data source.

11. The module of claim 9, wherein the source of three-dimensional location data comprises a position data acquisition source.

12. The module of claim 9, wherein the control processor is further configured to
    receive data representative of pitch attitude, and
    include the pitch attitude in the function generating of the control data, whereby the control data includes data representative of vertical target measurement for vertically positioning the beam on the target.

13. The module of claim 12, wherein the control processor is further configured to
    receive data representative of roll attitude, yaw attitude, or both, and include the roll attitude, yaw attitude, or both in the function generating of the control data.

14. The module of claim 9, wherein the control processor is further configured to
receive data representative of roll attitude, yaw attitude, or both, and
include the roll attitude, yaw attitude, or both in the function generating of the control data.

15. The module of claim 14, wherein control data includes data representative of a vertical target measurement for vertically positioning a beam on a target of an aircraft windshield.

16. The module of claim 9, wherein the function includes a first windshield slant angle, a second windshield slant angle, or both.

17. A method for illuminating a target on an aircraft windshield corresponding to a three-dimensional location outside of an aircraft, such method comprising:
receiving navigation data representative of at least aircraft position and heading;
receiving three-dimensional location data of at least one exterior target,
determining an angle to each exterior target,
determining a track angle;
generating control data as a function of a plurality of cockpit references, the angle to each exterior target, and the track angle, wherein the control data comprises data representative of a lateral target measurement for laterally positioning a beam on an aircraft windshield target for each exterior target; and
providing the control data to an illumination source for positioning each beam on the aircraft windshield target in response to the control data corresponding to a position through which a pilot can observe a visual object corresponding to each exterior target.

18. The method of claim 17, wherein the source of three-dimensional location data comprises a navigation reference data source.

19. The method of claim 17, wherein the source of three-dimensional location data comprises a position data acquisition source.

20. The method of claim 17, wherein the control processor is further configured to
receive data representative of pitch attitude, and
include the pitch attitude in the function generating of the control data, whereby the control data includes data representative of vertical target measurement for vertically positioning the beam on the target.

21. The method of claim 20, further comprising
receive data representative of roll attitude, yaw attitude, or both, and
include the roll attitude, yaw attitude, or both in the function generating of the control data.

22. The method of claim 17, wherein the control processor is further configured to receive data representative of roll attitude, yaw attitude, or both, and
include the roll attitude, yaw attitude, or both in the function generating of the control data.

23. The method of claim 22, wherein control data includes data representative of a vertical target measurement for vertically positioning a beam on a target of an aircraft windshield.

24. The method of claim 17, wherein the function includes a first windshield slant angle, a second windshield slant angle, or both.

* * * * *